May 10, 1949.                L. O. KEEFER                 2,469,505
                              BLEED VALVE
                           Filed Feb. 22, 1945
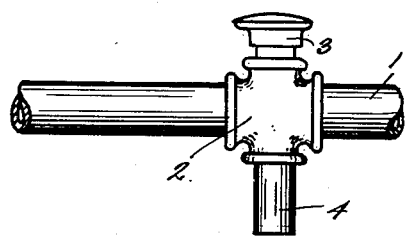
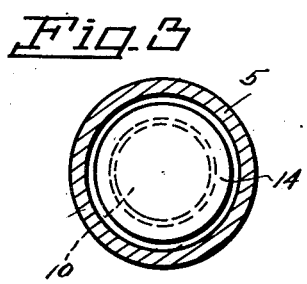
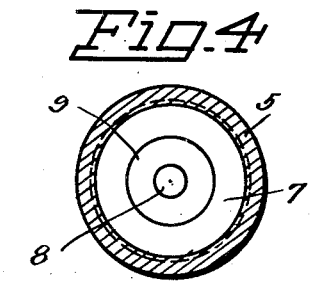
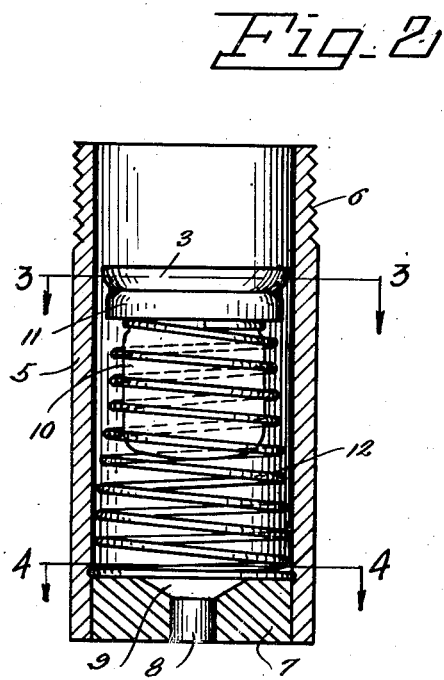
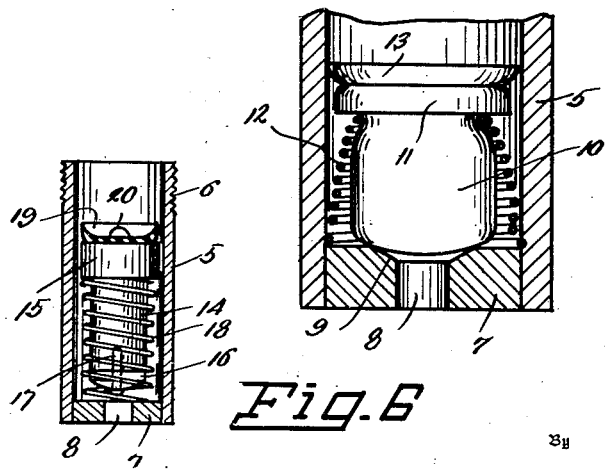
Inventor
Leonard O. Keefer
By
                                    Attorney Patented May 10, 1949

2,469,505

UNITED STATES PATENT OFFICE 2,469,505

BLEED VALVE

Leonard O. Keefer, Spokane, Wash., assignor to Keefer Industries, Spokane, Wash.

Application February 22, 1945, Serial No. 579,191

1 Claim. (Cl. 137—34.2)

This invention relates to a bleeder valve particularly adapted for use in a sprinkler system used for watering lawns or for irrigating fields of growing plants wherein a pipe line leads from a source of water under pressure and is provided with a number of sprinkler nozzles spaced from each other longitudinally of the pipe line and projecting upwardly therefrom for discharging water upwardly above the ground.

One object of the invention is to provide a bleeder valve mounted at the bottom of a coupling carrying a sprinkler nozzle so that when water is shut off from the pipe line, water in the pipe line may drain out through the valve instead of remaining in the pipe line.

Another object of the invention is to provide a bleeder valve so formed that, while its valve member will be normally held open, pressure created when water is turned on in the pipe line will force the valve member to closed position and thus prevent water from escaping through the bleeder valve and causing all of the water to be discharged through the spray nozzles of the pipe line.

Another object is to provide the bleeder valve with a valve member yieldably held in open position by a spring in the casing and coiled about the body portion of the valve member with its upper end abutting a head carrying a cup which is normally spaced from walls of the valve casing but adapted to be flattened and expanded into contact with the valve casing walls when subjected to pressure of water flowing under pressure through the pipe line.

Another object is to provide a bleeder valve which is simple in construction and capable of being easily removed and cleaned when necessary.

In the accompanying drawings:

Fig. 1 is a view in elevation showing a portion of a sprinkler system equipped with a bleeder valve of the improved construction.

Fig. 2 is a sectional view taken longitudinally through the improved bleeder valve.

Fig. 3 is a transverse sectional view on the line 3—3 of Fig. 2.

Fig. 4 is a sectional view on the line 4—4 of Fig. 2.

Fig. 5 is a sectional view taken longitudinally through the lower portion of the bleeder valve and showing the valve member closed.

Fig. 6 is a sectional view taken longitudinally through a valve of modified construction.

This improved bleeder valve is particularly adapted for use in a pipe line of a sprinkler system wherein a number of pipes forming the pipe line 1 are connected by couplings and each coupling 2 carries at its upper end a sprinkler nozzle 3 for discharging a spray of water upwardly above the ground in which the pipe line is buried. The bleeder valve, indicated in general by the numeral 4, is mounted at the bottom of the coupling 2 and has a cylindrical casing 5 having its upper end open and externally threaded, as shown at 6, so that it may be screwed into the coupling and easily removed when it is necessary to clean the valve. At its lower end, the casing is closed by a plug 7 formed with a central outlet port 8 having a valve seat 9 about its upper end. A valve member 10 is slidably housed in the casing and, in the embodiment of the invention illustrated in Figs. 2 through 5, this valve member has a body of soft rubber which may be compressed when forced against the closure plug 7 and have close contacting engagement with the valve seat 9 to close the outlet port 8. A head 11 is formed about the upper or inner end of the valve body and this head projects radially from the valve body to form an annular shoulder for engagement by the upper end of a helical spring 12. The spring rests upon the closure plug 7 and tapers toward its upper end, the upper portion of the spring being disposed about the valve body 10 and abutting the head 11 so that the valve member will be normally held in the position of Fig. 2. Since the upper convolutions of the spring fit tightly about the constricted upper end of the valve body, as shown in Fig. 5, the valve body cannot slip out of engagement with the spring. A cup 13, formed of pliable material, is carried by the head 11 and has a concave face presented upwardly so that, when this cup is subjected to pressure of water in the pipe line and casing 5, it will be expanded and its marginal edge brought into contact with the wall of the casing. The pressure of the water will force the valve member downwardly in opposition to the action of the spring 12 and, when the lower end of the valve body engages the plug 7, the valve body will be expanded transversely and pressed into tight contact with the valve seat 9 to seal the outlet bore or port 8. When water is shut off from the pipe line, the spring will raise the valve member and, since the cup 13 will then return to its normal shape and its margins be spaced from the wall of the casing, water may drain from the pipe line through the casing 5 and out through port 8. It will be understood that by inserting a T-coupling in the pipe line at various selected points, bleeder valves may be installed at points other than under the discharge nozzles.

Instead of forming the valve member as shown in Figs. 2 through 5, it may be formed as shown in Fig. 6. In this embodiment of the invention, the valve member 14 may be formed of metal, or other desired material, and has a head 15 formed integral with its upper end. A washer 16, formed of rubber or a suitable composition, is secured to the lower end of the valve member by a screw 17 for closing the outlet port 8 and the valve member is yieldably held in open position by a spring 18 coiled about the valve member with its lower end resting upon the closure plug 7 and its upper end bearing against the head 15. A cup 19, corresponding to cup 13 is secured against the upper end of the valve member by a screw 20 for action by water under pressure to depress the valve member and close the outlet port.

In both embodiments of the invention illustrated and described, the valve is closed when water under pressure is flowing through the pipe line and, when water is shut off from the pipe line, the valve opens and water will drain from the pipe line. When it is necessary to clean the bleeder valve or make repairs or replacements, the casing 5 is unscrewed from the coupling into which it is screwed and the valve member and spring may then be removed from the casings. Rocks may be placed about the bleeder valve to prevent clogging of the port 8.

What is claimed is:

A bleeder valve for a pipe line comprising a cylindrical casing having an open upper end externally threaded for connection with the pipe line with the casing mounted vertically in depending relation thereto, a closure for the lower end of said casing said closure having a centrally located drain port and a seat about the inner end of the port, a valve member in said casing shiftable vertically therein and having a body of elastic material spaced from the inner wall of the casing, a head at the upper end of said body, having marginal portions projecting radially therefrom and spaced from the walls of the body, a helical spring in said casing resting upon said closure and having its upper portion surrounding the body and its upper end bearing against the under face of the projecting marginal portion of said head and yieldably holding the valve number in a normally raised position out of engagement with the head, and a flexible concavo-convexed cup formed of elastic material carried by and extending upwardly from said head with its marginal portions free from the head and normally spaced from the inner wall of the casing, said cup having its concaved face presented upwardly for contact by liquid entering the casing through its open upper end whereby liquid under pressure in the upper portion of the casing may spread marginal portions of the cup into engagement with the inner wall of the casing and force the valve member downwardly in opposition to action of the spring and hold the lower end of the body against the closure and the seat and close the drain port.

LEONARD O. KEEFER.

REFERENCES CITED

The following references are of record in the file of this patent:

UNITED STATES PATENTS

| Number | Name | Date |
| --- | --- | --- |
| 1,979 | Jenkins | June 6, 1865 |
| 540,481 | Boyer | June 4, 1895 |
| 829,524 | Happ | Aug. 28, 1906 |
| 1,021,537 | Lawnin | Mar. 26, 1912 |
| 1,028,722 | Hess | June 4, 1912 |
| 1,707,993 | Piquerez | Apr. 9, 1929 |
| 1,710,844 | Sherman | Apr. 30, 1929 |
| 2,022,724 | Kudolla | Dec. 3, 1935 |
| 2,136,163 | White | Nov. 8, 1938 |

FOREIGN PATENTS

| Number | Country | Date |
| --- | --- | --- |
| 655,311 | Germany | Jan. 13, 1938 |